United States Patent Office 3,429,853
Patented Feb. 25, 1969

3,429,853
PROCESS FOR PREPARING PREPOLYMERS OF UNSATURATED HETEROCYCLIC COMPOUNDS AND RESULTING PRODUCTS
Roy T. Holm, Orinda, Calif., assignor to Shell Oil Company, New York, N.Y., a corporation of Delaware
No Drawing. Filed July 24, 1964, Ser. No. 385,077
U.S. Cl. 260—63
Int. Cl. C08f 7/12, 1/64
9 Claims

ABSTRACT OF THE DISCLOSURE

Prepolymer compositions prepared from unsaturated heterocyclic monomers are disclosed. These compositions comprise a reaction product of (1) a compound containing at least one cyclic structure containing an ethylenic group adjacent to a hetero atom, and one other ethylenic group, and (2) a salt of an inorganic acid, the anion portion of which contains at least two dissimilar elements. Uses of the above-noted compositions such as in the preparation of laminated products, are also disclosed.

---

This invention relates to the preparation of prepolymers and resulting products. More particularly, the invention relates to a process for preparing curable prepolymers of unsaturated heterocyclic compounds, to the resulting products and to their use, particularly in the formation of laminated products.

Specifically, the invention provides a new and highly efficient process for preparing prepolymer compositions from unsaturated heterocyclic monomers which are stable at room temperature but can be cured at elevated temperatures, which process comprises heating (1) a compound containing at least one cyclic structure containing an ethylenic group adjacent to a hetero atom, and one other ethylenic group, and preferably a compound possessing a plurality of dihydropyran rings, in the presence of (2) a salt of an inorganic acid the anion portion of which contains at least two dissimilar elements and preferably an amine salt of one of the aforementioned acids.

As a special embodiment, the invention provides a process for making prepolymer compositions of varying viscosities which are stable at room temperature which comprises heating the above-described compound containing the cyclic structure containing an ethylenic group adjacent to a heteroatom, with an amine salt of an inorganic acid as described above wherein the amine portion has a pKb value of less than 9.5, until the desired viscosity has been obtained, and then cooling the mixture to room temperature.

The use of the above-described curable prepolymer compositions in the preparation of laminated products, and preferably those having good heat resistance for use in the missile and rocket industries.

It has been found that compounds having the cyclic ethylenic group adjacent to a heteroatom, such as the dihydropyran compounds, can be polymerized by the treatment with an acid catalyst, such as phosphoric acid. The composition, however, sets up very rapidly to form a brittle product of limited value. The lack of control of the cure has, for example, limited their use in making laminates, etc.

It is an object of the invention, therefore, to provide a new process for preparing prepolymers of unsaturated heterocyclic compounds. It is a further object to provide a method for preparing prepolymers which are stable at room temperature. It is a further object to provide a process for preparing stable prepolymers of controllable viscosity. It is a further object to provide prepolymer compositions useful in making superior laminated products. It is a further object to provide prepolymer compositions which can be used to prepare products having outstanding hardness and heat resistance. These and other objects of the invention will be apparent from the following detailed description thereof.

It has now been discovered that these and other objects may be accomplished by the new process of the invention comprising heating (1) a compound containing at least one cyclic structure containing an ethylenic group adjacent to a heteroatom, and one other ethylenic group, and preferably a compound possessing a plurality of dihydropyran rings, in the presence of (2) a salt of an inorganic acid the anion portion of the said acid containing at least two dissimilar elements, and preferably an amine salt of an inorganic acid. It has been found that by this new technique one is able to form a curable prepolymer composition which is stable at room temperature and which can be subsequently heated to form the desired cured product. Surprisingly, it has been found that the viscosity of the prepolymer can be controlled by the temperature and length of heating, and by controlled heating and subsequent cooling one can obtain a prepolymer of varying viscosities. It has been further found that the resulting cured products have excellent heat resistance and hardness and good resistance to solvents and the like. These properties make the new prepolymer compositions ideal materials for preparation of laminated products needed in the missile and rocket industries.

The unsaturated compounds used in making the prepolymers comprise those compounds possessing at least one cyclic structure containing an ethylenic group adjacent to the heteroatom, and one other ethylenic group. By heteroatom is meant a polyvalent atom other than carbon, such as, for example, oxygen, nitrogen, sulfur, phosphorous, arsenic, antimony, tin, lead, silicon and the like. Cyclic groups which contain both the heteroatom and the ethylenic group include, among others, the dihydropyran, tetrahydropyridine, dihydrothiophene, dihydropyrrole, dihydrofuran, and like rings and their substituted derivatives, such as, for example, their halogenated, alkylated, alkoxy-substituted derivatives and the like.

The other ethylenic group present in the molecule can be contained in another cyclic structure of the above-noted composition or it can be contained in a straight chain group attached to the cyclic structure through an ether, ester, sulfur, or like linkage.

Examples of such compounds are those of the formula

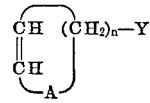

wherein A is a member of the group consisting of oxygen, sulfur, nitrogen, phosphorous, arsenic, antimony, tin, lead, silicon and germanium, $n$ is an integer of at least 1 and Y is an organic radical containing an ethylenic group which is attached to a CH— group in the ring and preferably one containing an ester, ether or amide linkage in addition to the ethylenic group.

Preferred compounds are those wherein there are two or more of the above-described cyclic structures joined through a linking group. The group joining the above-described heterocyclic rings may be of any type of polyvalent connecting radical. Examples of these radicals include the simple inorganic or organic radicals such as bivalent hydrocarbon radicals or hydrocarbon radicals containing other elements such as oxygen, nitrogen, sulfur, phosphorous and the like, in the said radicals. The radicals may also be substituted with halogen atoms, ether, ester, mercaptan, urethane, amide, imide and the like radicals. The polyvalent connecting radicals may also be of a polymeric nature.

A preferred group of the above-described compounds may be exemplified by the following structural formula:

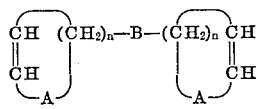

wherein A is a member of the group comprising oxygen, sulfur, nitrogen, phosphorous, arsenic, antimony, tin, lead, silicon and germanium, B is any organic or inorganic element or radical, $n$ is an integer of at least 1.

A particularly preferred group of the heterocyclic compounds include those represented by the following structural formula:

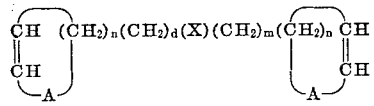

wherein A and $n$ are as described above, $d$ and $m$ are 0 to 6 and X is a member of the group comprising hydrocarbon radicals, —$YX_1Y$— radical (wherein $X_1$ is a bivalent hydrocarbon radical and Y is O, N or S) ether oxygen atom, sulfur atom, ester linkage, nitrogen atom, amide, imide, urethane linkage and the like.

Coming under special consideration, particularly because of the superior properties of the resulting cured products are the

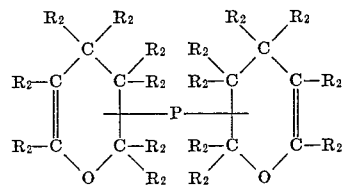

wherein $R_2$ is hydrogen, alkyl, alkoxy or halogen, P is a hydrocarbon radical or substituted hydrocarbon radical, such as one containing an ether oxygen, —S—, —SO—, —$SO_2$—, —SS—, ester, amide, imide, carbamyl, epoxide, or the like.

Examples of the above-described compounds include, among others, 3,4-dihydro-1,2-pyran - 2 - methyl 3,4-dihydro-1,2-pyran-2-carboxylate

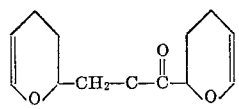

3,4-dihydro - 1,2 - pyran-2-methyl 2,3-dihydrothiophene-2-carboxylate

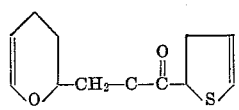

3,4-dihydro-1,2-pyran - 2 - methyl N-methyl-1,2,3,4-tetrahydropyridine-2-carboxylate

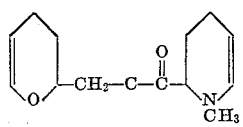

3,4-dihydro-1,2-pyran - 2 - methyl N-methyl-2,3-dihydropyrrole-2-carboxylate

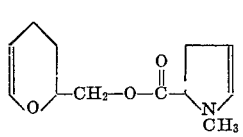

3,4-dihydro-1,2-pyran - 2 - methyl 2,3-dihydrofuran-2-carboxylate

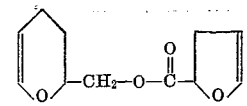

1,5-bis(3,4-dihydro-1,2-pyran-2-methoxy)pentane

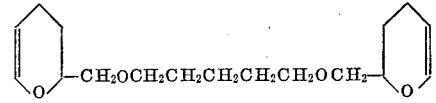

1,2,6-tris(3,4-dihydro-1,2-pyran-2-methoxy)hexane

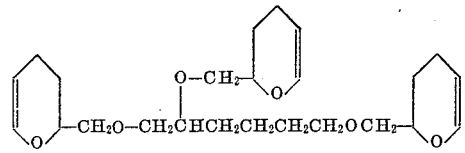

1,5-bis(3,4-dihydro-1,2-pyran-2-methylmercapto-pentane

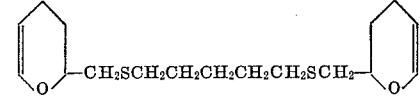

N-methyl-2,3-dihydropyrrole - 2 - methyl N-methyl-1,2,-3,4-tetrahydropyridine-2-carboxylate

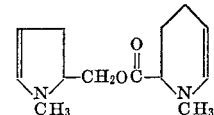

3,4-dihydro-2,5-dioctyl - 1,2 - pyran-2-butyl 3,4-dihydro-1,2-pyran-2-carboxylate

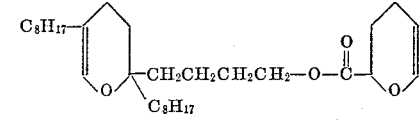

2,3-dihydrofuran-2-octyl 2,3-dihydrofuran-2-carboxylate

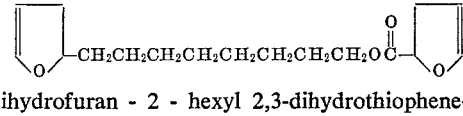

2,3-dihydrofuran - 2 - hexyl 2,3-dihydrothiophene-2-carboxylate

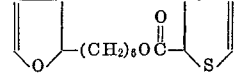

Other examples include compounds of the formulae:

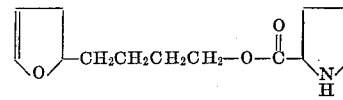

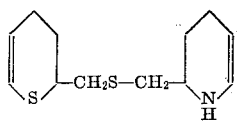

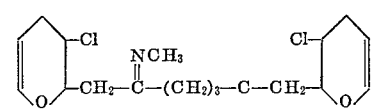

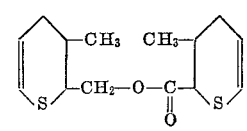

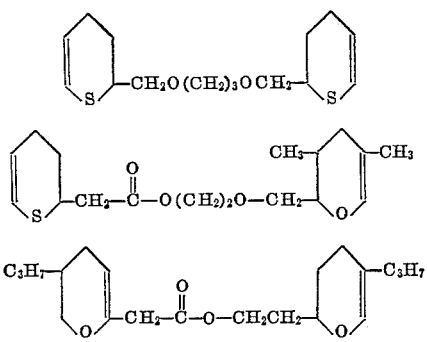

Other examples include compounds having more than 2 heterocyclic rings, such as

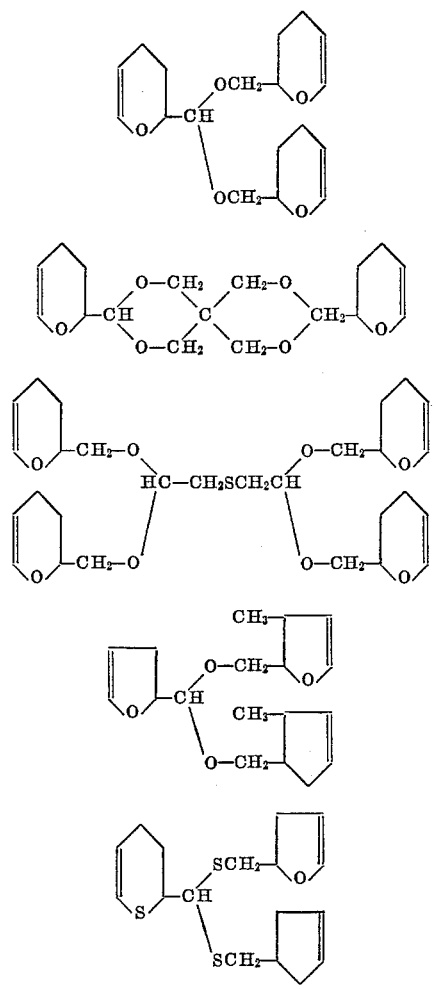

A valuable group include those of the formula

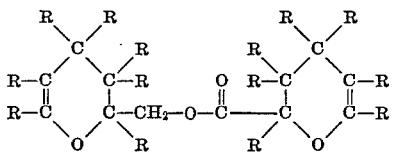

in which each R represents hydrogen or a hydrocarbon radical (and preferably an alkyl group). Examples of these compounds include, among others, 3,4-dihydro-1,2-pyran-2-methyl 3,4-dihydropyran-2-carboxylate,
4-butyl-3,4-dihydro-1,2-pyran-2-methyl 3,4-dihydropyran-2-carboxylate,
3,4-diethyl-3,4-dihydro-1,2-pyran-2-methyl 3,4-dihydropyran-2-carboxylate,
3,4-diisopropyl-3,4-dihydro-1,2-pyran-2-methyl 3,4-diisopropyl-3,4-dihydropyran-2-carboxylate,
4-hexyl-3,4-dihydro-1,2-pyran-2-methyl 3,4-diisopropyl-3,4-dihydropyran-2-carboxylate,
4,5-di-tert-butyl 3,4-dihydropyran-2-methyl 4-hexyl-3,4-dihydropyran-2-carboxylate,
4,6-dioctyl-3,4-dihydropyran-2-methyl 4-octyl-3,4-dihydropyran-2-carboxylate,
2,5-didodecyl-3,4-dihydropyran-2-methyl 4-octyl-3,4-dihydropyran-2-carboxylate.

Other less preferred examples are those wherein the other ethylenic group is in a non-cyclic group, such as, for example, allyl ester of 3,4-dihydropyran-2-carboxylic acid, vinyl ester of 3,4-dihydropyran-2-carboxylic acid, methallyl ether of 3,4-dihydro-1,2-pyran-2-methanol, butenyl ester of 3,4-diisopropyl-3,4-dihydropyran-2-carboxylic acid, 2,4-hexadienyl ether of 4,6-dioctyl-3,4-dihydropyran-2-methanol, chloroallyl ether of 4-octyl-3,4-dihydropyran-2-ethanol, and the like.

The above-described compounds can be prepared by a variety of different methods. The esters of the heterocyclic acids and heterocyclic alcohols can, for example, be prepared by reacting a salt of the acid with a halide corresponding to the heterocyclic alcohol. The ethers can be obtained by reacting the alcohol with a halide of the heterocyclic compound in the presence of a suitable catalyst. The amides may be prepared by reacting the heterocyclic amine with the desired heterocyclic acid in the presence of conventional catalysts. Alternatively the esters may be prepared by reacting an aldehyde, such as the 3,4-dihydro-1,2-pyran-2 - carboxaldehyde with the catalyst, such as aluminum isopropoxide, so as to effect a Tishchenko reaction and formation of an ester group between two molecules of the aldehyde. This latter method is described in U.S. 2,537,921.

The other component to be used in making the prepolymer compositions comprises a salt of an inorganic acid, the anionic portion of which contains at least two dissimilar elements. One of the dissimilar elements is preferably non-metal (e.g., as described in chaper 6 of Epheraim "Inorganic Chemistry" 1939 edition) such as boron, silicon, sulfur, nitrogen, selenium, tellurium, and phosphorus. One of the other dissimilar elements is preferably an element which contains two or more electrons in its outer orbit and thereby assume a negative charge such as oxygen, fluorine and chlorine.

Examples of the above-described acids include, among others, fluoboric acid, persulfuric acid, sulfuric acid, fluoberyllic acid, boric acid, hypochlorous acid, iodic acid, periodic acid, phosphoric acid, phosphorus acid, selenious acid, arsenous acid, telluric acid, fluosilicic acid, silicic acid, manganic acid, and the like.

Preferred acids are those of the general formula $$H_a[(X)_w(Z)_y]$$

wherein X is a non-metal having an atomic weight above 2, Z is an element which tends to gain from 1 to 2 electrons in its outer orbit, $w$ is an integer, $y$ is an integer greater than 1, and $a$ equals the valency of the radical $(X)_w(Z)_y$, such as sulfuric acid, fluoboric acid, fluosilicic acid, persulfuric acid, phosphoric acid, and the like.

Particularly preferred acids are those containing fluorine, and especially fluoboric acid.

The cationic portion of the salt molecule may be a metal or non-metal and is preferably a nitrogen containing group such as an amine. Preferred amines to be used are those having a pKb value less than 9.5. Examples of the amines that might be used in making these salts include piperidine, diethyl aniline, dimethyl aniline, morpholine, aniline and diethylene triamine, dimethyl amine, dibutyl amine, N,N-diethylpiperidine and the like and mixtures thereof.

Examples of the salts to be used in making the prepolymer compositions include, among others, diethyl aniline fluoborate, dimethyl aniline fluoborate, diethyl aniline boron trifluoride, morpholine sulfate, dimethyl aniline phosphate, piperidine fluoborate, methyl amine boron trifluoride, diethyl aniline borate, diethyl amine sulfate, butyl amine phosphate, diethyl aniline silicate, octyl amine phosphate, diethylaniline fluosilicate, diethylene triamine boron trifluoride, hexamethylene diamine fluoborate, allyl amine fluoborate, cyclohexylamine phosphate, diallyl amine phosphate, dioctyl fluosilicate and the like and mixtures thereof.

In making the prepolymer compositions of the present invention one may mix one or more of the above-described unsaturated monomers with one or more of the above-described salts and then heat the resulting mixture until the desired viscosity is obtained. The amount of the salt employed in the process may vary over a wide range. In general, the amount of the salt will vary from about .1% to about 5% by weight of the unsaturated monomer. Particularly preferred amounts of the salt vary from about .5% to 1.5% by weight of the monomer.

The temperature employed in the heating will vary depending upon the catalyst and the desired viscosity. In general temperatures employed may vary from about 40° C. to about 125° C. Preferred temperatures range from about 75° to 100° C. After the desired viscosity is obtained the mixture should then be cooled to about room temperature to prevent further increase in the viscosity.

The prepolymer compositions formed by the above process may be utilized for a great variety of different applications. They may be utilized to form various types of coating and impregnating compositions or in making cast or molded plastic articles. The compositions are particularly suited for use in making laminated products as they have ability to adhere to the substrate and to be cured under conventional limited conditions to form hard heat resistant products having good chemical resistance.

In making the laminates one may apply as by dipping, painting, spraying or padding the desired prepolymer composition onto the substrate, removing any excess material and then subjecting the resulting product to the desired pressure and temperature to effect a cure. The material treated in this manner may be regular sheets of cloth, paper, or wood and the like, or may be strands or fibers which may be alternately woven or wound into the desired composite structure. The new compositions are particularly suited for use in a filament winding technique in that they can be easily applied to the glass strands and treated material wound on the mandrel to form the desired laminated product. The product is then subjected to conventional pressures and temperatures for curing, e.g., 125° C. to 300° C. and pressure 100 p.s.i. to 2000 p.s.i.

To illustrate the manner in which the invention may be carried out the following examples are given. It is to be understood, however, that the examples are for the purpose of illustration and that the invention is not to be regarded as limited to any of the specific conditions or reactants recited therein. Unless otherwise specified, parts described in the examples are parts by weight.

EXAMPLE I

This example illustrates the preparation of a prepolymer composition from 3,4-dihydro-1,2-pyran-2-methyl-3,4-dihydro-1,2-pyran-2-carboxylate and a salt of a diethyl aniline and fluoboric acid.

100 parts of the above-described pyran carboxylate was mixed with one part of diethyl aniline fluoborate and the mixture stirred at room temperature and allowed to stand. The composition remained stable at room temperature with no change in viscosity for over a period of 6 weeks. The solution was then heated at 100° C. and a slow increase in viscosity took place. After 35 minutes of heating the viscosity was 11 poises at 25° C. On cooling to room temperature the polymerization stopped and the viscosity remained at 11 poises.

At 150° C. the solution gelled exothermically in 15 minutes or less. Castings were prepared and cured four hours at 150° C.

Tensile strength, p.s.i. _____ 4,431
Modulus×$10^5$ _____ 4.38
Elongation, percent _____ 1.05
Flexural strength, p.s.i. _____ 17,900
Compressive strength, p.s.i. _____ 22,000
Izod impact, ft. lbs./inch of notch _____ 0.37
Heat distortion, ° C. _____ 204
Barcol hardness _____ 45
Percent increase in weight after one month solvent soak:
    Water _____ +2.28
    Acetone _____ +0.45
    Benzene _____ +0.48
    10% NaOH _____ +0.48
    10% $H_2SO_4$ _____ +2.06

Glass cloth laminates were readily prepared from the resin that had been bodied to eleven poises as described above. They were cured for four hours at 150° C.

Flexural strength:
    Tested at 25° C.—
        P.s.i. _____ 96,200
        Mod.×$10^6$ _____ 3.11
    Tested at 149° C.—
        P.s.i. _____ 40,300
        Mod.×$10^6$ _____ 2.41
    Tested at 260° C.—
        P.s.i. _____ 13,200
        Mod.×$10^6$ _____ 1.76
    Tested at 260° C. after 200 hours—
        P.s.i. _____ 3,100
        Mod.×$10^6$ _____ 0.68
    Tested at 25° C. after 24 hours in boiling water—
        P.s.i. _____ 48,000
        Mod.×$10^6$ _____ 2.76

EXAMPLE II

Example I was repeated with the exception that the salt employed was piperidine fluoborate. The properties of the cured product are as follows:

Tensile strength, p.s.i. _____ 6,094
Modulus×$10^5$ _____ 4.22
Elongation, percent _____ 1.63
Flexural strength, p.s.i. _____ 20,200
Compressive strength, p.s.i. _____ 24,600
Izod impact, ft. lbs./inch of notch _____ 0.28
Heat distortion, ° C. _____ 180

EXAMPLE III

Example I was repeated with the exception that the salt employed was dimethyl aniline fluoborate. The properties of the cured product are as follows:

Tensile strength, p.s.i. _____ 4,417
Modulus×$10^5$ _____ 4.54
Elongation, percent _____ 1.00
Flexural strength, p.s.i. _____ 14,700
Izod impact, ft. lbs./inch of notch _____ 0.31
Heat distortion, ° C. _____ 207
Percent increase in weight after one month solvent soak:
    Water _____ +2.39
    Acetone _____ +0.03
    Benzene _____ +0.49
    NaOH (10%) _____ +0.87
    $H_2SO_4$ (10%) _____ +2.19

EXAMPLE IV

Example I was repeated with the exception that the salt employed was morpholine fluoborate. Related results are also obtained in this case.

EXAMPLE V

Example I was repeated with the exception that the salt employed was diethyl aniline boron trifluoride. Related results are also obtained in this case.

EXAMPLE VI

Example I was repeated with the exception that the unsaturated heterocyclic compound employed was tris-(3,4-dihydro-2H-pyran-2-methyl) phosphate. The cured product had a heat distortion point of 155.3° C. and a Barcol hardness of 48.

EXAMPLE VII

Example I was repeated with the exception that the unsaturated heterocyclic compound employed was bis-(3,4-dihydro-2H-pyran-2-methyl) ether. The cured product had a heat distortion point of 202° C. and a Barcol hardness of 44.

EXAMPLE VIII

Example I was repeated with the exception that the heterocyclic compound employed was 1,4-bis(3,4-dihydro-2H-pyran-2-methoxy)butene-2. The cured product had a heat distortion point of 71.5° C. and Barcol hardness of 23.

EXAMPLE IX

Example I was repeated with the exception that the heterocyclic compound employed was 1,4-bis(3,4-dihydro-2H-pyran-2-methoxymethyl)benzene. The cured product had a heat distortion point of 105° C. and a Barcol hardness of 27.

EXAMPLE X

Example I was repeated with the exception that the heterocyclic compound employed was bis(3,4-dihydro-2H-pyran-2-methyl)maleate. The cured product had a heat distortion point of 159° C. and a Barcol hardness of 43.

EXAMPLE XI 100 parts of 3,4-dihydro-1,2-pyran-2-methyl-3,4-dihydro-1,2-pyran-2-carboxylate was mixed with .5 part of methyl amine boron trifluoride and the mixture stirred at room temperature and allowed to stand. The composition remained stable at room temperature with no change in viscosity for over a period of 6 weeks. The mixture was heated at 100° C. and a slow increase in viscosity took place. On cooling to room temperature, the polymerization stopped and the viscosity remained constant.

The mixture was then cured by heating at 150° C. for 8 hours. The properties of the hard cured product are as follows:

| | |
|---|---:|
| Tensile strength, p.s.i. | 7,965 |
| Modulus×10⁵ | 4.08 |
| Elongation, percent | 2.42 |
| Flexural strength, p.s.i. | 16,900 |
| Compressive strength, p.s.i. | 21,400 |
| Izod impact, ft. lbs./inch of notch | 0.42 |
| Heat distortion, ° C. | 190 |
| Percent increase in weight after one month solvent soak: | |
| Water | +1.6 |
| Acetone | 2.1 |
| Benzene | 0.24 |
| NaOH (10%) | 1.17 |
| H₂SO₄ (10%) | +1.47 |

EXAMPLE XII

Examples I to V are repeated with the exception that the heterocyclic compound employed is replaced with each of the following: N-methyl-2,3-dihydropyrrole-2-methyl N-methyl-1,2,3,4 - tetrahydropyridine-2-carboxylate; 3,4-dihydro-2H-pyran-methyl N - methyl-1,2,3,4-tetrahydropyridine-2-carboxylate; 3,4 - dihydro-2H-pyran-2-methyl 2,3-dihydrothiophene-2-carboxylate and 3,4-dihydro-2H-pyran-2-methyl 2,3-dihydrofuran-2-carboxylate. Related results are obtained.

I claim as my invention:

1. A process for making prepolymer compositions which comprises heating at a temperature ranging from about 40° C. to about 125° C. (1) a compound of the formula:

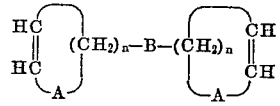

wherein A is a member of the group consisting of oxygen, sulfur and nitrogen, B is a member of the group consisting of a hydrocarbon radical and hydrocarbon radicals substituted with ether oxygen,

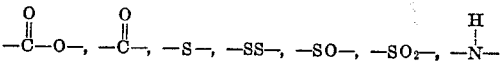

or —NR₁ (wherein R is hydrocarbon), n is 1 to 3, with 0.1% to 5% by weight of (2) a salt of an inorganic acid having the formula:

$$Ha[(X)_w(Z)_y]$$

wherein X is a non-metal having an atomic weight above 2, Z is an element which tends to gain from 1 to 2 electrons in its outer orbit, w is an integer, y is an integer greater than 1, and a equals the valency of the radical $(X)_w(Z)_y$, said heating being sufficient to effect the desired increase in viscosity without gelling the mixture.

2. A process for making a curable prepolymer composition which comprises heating at a temperature ranging from about 40° C. to about 125° C. so as to effect an increase in viscosity (1) a compound of the formula:

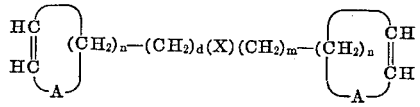

wherein A is a member of the group consisting of oxygen, sulfur and nitrogen, X is a member of the group consisting of hydrocarbon radicals, ether oxygen,

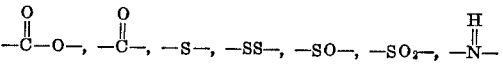

or —NR₁ (wherein R₁ is hydrocarbon), n is 1 to 3, d and m are integers of 0 to 1, with 0.1% to 5% by weight of (2) a salt of an amine having a pKb value less than 9.5 and an inorganic acid having the formula:

$$Ha[(X)_w(Z)_y]$$

wherein X is a non-metal having an atomic weight above 2, Z is an element which tends to gain from 1 to 2 electrons in its outer orbit, w is an integer, y is an integer greater than 1, and a equals the valency of the radical $(X)_w(Z)_y$.

3. A process as in claim 2 wherein the salt is a dialkyl aniline fluoborate.

4. A process as in claim 2 wherein the heterocyclic compound is 3,4-dihydro-1,2-pyran-2-methyl-3,4-dihydro-1,2-pyran-2-carboxylate.

5. A process for forming a prepolymer composition which is stable at room temperature which comprises heating a compound of the formula:

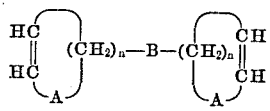

wherein A is a member of the group consisting of oxygen, sulfur and nitrogen, B is a member of the group consisting of a hydrocarbon radical and hydrocarbon radicals substituted with ether oxygen,

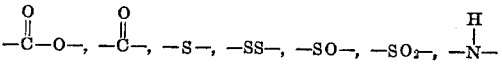

or —NR₁ (where R₁ is hydrocarbon), and n is 1 to 3, with 0.1% to 5% by weight of diethylaniline fluoborate at a temperature ranging from about 40° C. to about 125° C. to effect the desired increase in viscosity and then cooling the mixture to room temperature.

6. A process for forming a prepolymer composition which comprises heating at a temperature ranging from about 40° C. to about 125° C. allyl 3,4-dihydro-1,2-pyran-2-carboxylate with 0.1% to 5% by weight of a salt of an amine having a pKb value less than 9.5, and fluoboric acid and then cooling the resulting mixture to room temperature.

7. A room stable composition which may be converted on heat to form a cured product comprising a non-gelled reaction mixture of (1) a compound of the formula:

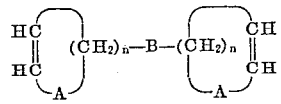

wherein A is a member of the group consisting of oxygen, sulfur and nitrogen, B is a member of the group consisting of a hydrocarbon radical and hydrocarbon radicals substituted with ether oxygen, $$-\overset{O}{\underset{\|}{C}}-O-, -\overset{O}{\underset{\|}{C}}-, -S-, -SS-, -SO-, -SO_2-, -\overset{H}{\underset{|}{N}}-$$

or $-NR_1$ (wherein $R_1$ is hydrocarbon), $n$ is 1 to 3, and 0.1% to 5% by weight of (2) a salt of an inorganic acid having the formula:

$$Ha[(X)_w(Z)_y]$$

wherein X is a non-metal having an atomic weight above 2, Z is an element which tends to gain from 1 to 2 electrons in its outer orbit, $w$ is an integer, $y$ is an integer greater than 1, and $a$ equals the valency of the radical $(X)_w(Z)_y$.

8. A composition stable at room temperature comprising a non-gelled reaction mixture of 3,4-dihydro-1,2-pyran-2-methyl-3,4-dihydro-1,2-pyran-2-carboxylate and 0.1% to 5% by weight of a salt of an amine having a pKb value less than 9.5, and fluoboric acid.

9. A composition as in claim 8 wherein the amine salt is diethylaniline fluoborate.

References Cited

FOREIGN PATENTS 610,417  11/1961  Belgium.

JOSEPH L. SCHOFER, *Primary Examiner.*

H. WONG, JR., *Assistant Examiner.*

U.S. Cl. X.R.

161—218, 219, 250, 251; 117—139.5, 155, 148, 138.8, 124; 260—88.3, 91.1, 79.3, 79.7, 89.7, 89.5, 41; 161—203, 204